US008532648B2

(12) United States Patent
Moritz et al.

(10) Patent No.: US 8,532,648 B2
(45) Date of Patent: Sep. 10, 2013

(54) GENERATING AN OD MATRIX

(75) Inventors: Simon Moritz, Stockholm (SE); Erik Mellegard, Skovde (SE); Jawad Mohamed Zahoor, Chennai (IN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/364,693

(22) Filed: Feb. 2, 2012

(65) Prior Publication Data

US 2013/0035089 A1 Feb. 7, 2013

Related U.S. Application Data

(63) Continuation of application No. PCT/EP2011/074312, filed on Dec. 30, 2011.

(60) Provisional application No. 61/515,482, filed on Aug. 5, 2011.

(51) Int. Cl.
*H04W 4/00* (2009.01)

(52) U.S. Cl.
USPC .................. 455/422.1; 455/456.1; 455/456.2; 370/352

(58) Field of Classification Search
USPC ............................... 455/423, 456.1; 370/352
See application file for complete search history.

(56) References Cited

U.S. PATENT DOCUMENTS

| | | | | |
|---|---|---|---|---|
| 5,402,117 | A * | 3/1995 | Zijderhand ................... | 340/905 |
| 2006/0293046 | A1 * | 12/2006 | Smith ........................... | 455/423 |
| 2010/0054140 | A1 * | 3/2010 | Stjernholm et al. .......... | 370/252 |
| 2010/0274693 | A1 * | 10/2010 | Bause et al. .................... | 705/32 |
| 2011/0055559 | A1 * | 3/2011 | Li et al. ......................... | 713/165 |
| 2012/0108261 | A1 * | 5/2012 | Miyake et al. ............. | 455/456.1 |

FOREIGN PATENT DOCUMENTS

WO 2007002118 A2 1/2007

OTHER PUBLICATIONS

Caceres. et at "Review of traffic data estimations extracted from cellular Networks", IET Intelligent Transport Systems, Jan. 4, 2008, vol. 2, No. 3, pp. 179-192, XP006031439.

Calabrese, et al., "Estimating Origin-Destination Flows Using Mobile Phone Location Data", IEEE Pervasive Computing, Apr. 1, 2011, vol. 10, No. 4, pp. 36-44, XP011385665.

Schneider, et al,, "Mobile Phones as a Basis for Traffic State Information", IEEE Conference on Intelligent Transportation Systems, Sep. 13-16, 2005, pp. 782-784, XP010843123.

International Search Report and Written Opinion from application No. PCT/EP2011/074312, mailed May 3, 2012, 15, pages.

* cited by examiner

*Primary Examiner* — Charles Shedrick
(74) *Attorney, Agent, or Firm* — Rothwell, Figg, Ernst & Manbeck, P.C.

(57) ABSTRACT

Computers, a user equipment, a computer system, computer program products, and a method for a computer system are disclosed. In some embodiments, the method comprises the steps of: receiving user IDs, cell IDs and time stamps associated with the cell IDs and the user IDs; requesting and receiving, from a cell ID database, geographical coordinates corresponding to the cell IDs; finding stations and times for each user ID based on, at least in part, the geographical coordinates and time stamps associated with each user ID; exchanging the stations with a place for each one of the stations; generating at least one OD sub-matrix associated with each user ID based on, at least in part, places and times of arrival and departure associated with these places; and merging the OD matrices into an OD matrix.

27 Claims, 9 Drawing Sheets

| Destination \ Origin | P1 | P2 | P3 | P4 | P5 | P6 | P7 | P8 |
|---|---|---|---|---|---|---|---|---|
| P8 | 30 | 6 | 4 | 20 | 9 | 7 | 10 | |
| P7 | 56 | 43 | 9 | 20 | 8 | 12 | | 9 |
| P6 | 200 | 136 | 497 | 310 | 206 | | 130 | 301 |
| P5 | 9 | 78 | 31 | 65 | | 23 | 4 | 7 |
| P4 | 6 | 14 | 43 | | 9 | 0 | 9 | 1 |
| P3 | 7 | 9 | | 40 | 8 | 2 | 5 | 6 |
| P2 | 10 | | 30 | 7 | 6 | 8 | 9 | 14 |
| P1 | | 31 | 45 | 50 | 5 | 6 | 43 | 6 |

GENERATING AN OD MATRIX

This application claims the benefit of U.S. Provisional Patent App. No. 61/515,482, filed on Aug. 5, 2011; this application is also a continuation of International Application No. PCT/EP2011/074312, filed on Dec. 30, 2011. The above identified applications are incorporated by reference herein in their entirety.

TECHNICAL FIELD

The invention relates to a method, computers, a computer system, a user equipment and computer program products associated with generation of an OD (Origin Destination) matrix.

BACKGROUND

Accurate estimation of origin/start and destination, hereinafter called OD estimation, is of interest in a number of use cases. It is, for example, of importance as basic data when planning a public transport system and when planning investments in new infrastructure like railways, trains, roads and buses.

Today OD estimation is generally performed in one of two ways, either by surveys among people or by using measurements of e.g. the number of road vehicles that passes a certain place (link traffic).

Surveys have some advantages over other techniques. You can for example get information on why a trip has been conducted, how many people that traveled in the same car and if they would have used public transportation if it had been available. A downside of surveys is that they are very expensive. Another downside with manually collected surveys is that people tend to forget how they traveled, when they left their place of origin/starting point, when they arrived etc. Sometimes people also lie about their traveling for one or another reason. All in all, this might not give a good foundation on which to build accurate estimations.

Link traffic flows can be obtained from measurement devices, such as cameras and inductive sensors, installed along most major roads and the data from these measurement devices could be used for OD estimation. Even though this is probably cheaper than surveys, it still requires installation and maintenance of measurement devices. Also, it can only give an OD estimation along roads where there are measurement devices installed and the result will only be a rough estimate.

The estimate is often in the form of a two-dimensional OD matrix having, for example the destinations on one axis and the origin on the other. The values in the matrix relate to the frequency of each O-D pair, e.g. how many vehicles that have started from a certain origin and where their trip ended in a certain destination. Typically, there is an OD matrix for a certain period of time. Thus, in a three-dimensional matrix, a third axis could represent a certain time period.

The idea of making an OD estimation with the help of a cellular telecommunications network has been disclosed in [1] N. Caceres et al., "Deriving origin-destination data from a mobile phone network", IET Intell. Transp. Syst., Vol. 1, No 1, p 15-26, March 2007 and [2] K. Sohn and D. Kim, "Dynamic Origin-Destination Flow Estimation Using Cellular Communication System", IEEE Transactions on vehicular technology, Vol. 57, No. 5, September 2008. In the two studies OD matrices are calculated or enhanced in a simulation model by use of cellular network data. An approach taken is to use cellular network data to get link traffic counts, and then use the counts in the calculation of an OD matrix. A big advantage of the methods described in [1] and [2] from a privacy perspective, is that it is very hard, if not impossible, to identify a single individual, at least as long as the link traffic flows on busy roads is studied. A drawback with e.g. [2] is however that since handover information is used to estimate link traffic volume, it can only be applied to mobile phones when in a call or sending/receiving data. It can also only give a very approximate solution, since the problem of finding OD matrices form traffic link counts is under determined. In their simulation they also assume that a mobile telephone is always connected to the closest base station, which is a simplification which is not quite true.

Another approach of tracking people using mobile phones is disclosed in [3] Y. Asakura and E. Hato, "Tracking survey for individual travel behavior using mobile communication instruments", Transportation Research Part C 12, 273-291, 2004. This article discloses a methodology where applications are installed on mobile communication instruments (not mobile phones) in order to collect data about which base station the mobile communication instruments are connected to. Using that data and an algorithm, it is determined if a person is standing still or moving. A similar algorithm is also known from [4] J. H. Kang et al., "Extracting Places from Traces of Locations", Mobile Computing and Communications Review, Volume 9, No. 3, July 2005. [3] never addresses the problem of having higher degree of sparse data which would be the case with data obtained in a cellular network today. In [3], special devices are used to collect data on the signal strength from nearby base stations at given, regular and quite frequent times. The retrieved information is therefore much denser in time than in a network with cellular telephones for consumer use. Furthermore, there is no aggregation of data into something that could be utilized for OD-estimation, especially there is no generation of an OD matrix.

SUMMARY

An object of the invention is to solve, or at least contribute to a solution of, the problem of creating a completely computerized solution for the generation of an OD matrix from data from one or more cellular telecommunications network.

The invention relates to a computer for supporting generation of an OD matrix based on, at least in part, network data associated with a plurality of user IDs. In one embodiment, the computer comprises: a receiving unit for receiving a user ID, cell IDs, and time stamps associated with the cell IDs and the user ID; a requesting unit for requesting and receiving, from a cell ID database, geographical coordinates corresponding to a cell ID; a station identification unit for finding stations and times based on, at least in part, the geographical coordinates and time stamps; a mapping unit for exchanging the stations with a place for each one of the stations; an OD matrix generating unit for generating at least one OD sub-matrix associated with the user ID based on, at least in part, places and times of arrival and departure associated with the places; and a sending unit for sending the OD sub-matrix to another computer. Hereby is achieved that an OD sub-matrix for one or more user IDs can be generated and sent for merging of a plurality of OD sub-matrices into an OD matrix. This can be done irrespective of how and where the network data is created. Since network data from at least one communications network is used, a large amount of data can be used, thus making the OD matrix useful for a more variety of purposes than they are today.

The invention also relates to another configuration of a computer for supporting generation of an OD matrix based on, at least in part, network data associated with a plurality of user IDs. In some embodiments, this computer comprises: a receiving unit for receiving a user ID, associated geographical coordinates, and time stamps associated with the geographical coordinates and the user ID; a station identification unit for finding stations and times based on, at least in part, the geographical coordinates and time stamps; a mapping unit for exchanging the stations with a place for each one of the stations; an OD matrix generating unit for generating at least one OD sub-matrix associated with the user ID based on, at least in part, places and times of arrival and departure associated with the places; and a sending unit for sending the OD sub-matrix to another computer.

The computers mentioned above may comprise a time adjustment unit for adjusting times of arrival and/or departure from the stations by a linear extrapolation based on, at least in part, data time stamped between the stations. Hereby is achieved that more accurate times for arrival and departures from stations are enabled, thus improving the accuracy of the OD matrix.

The computers may comprise: a clustering unit for clustering the stations into at least two clusters, and a calculation unit for calculating, for each one of the clusters, a position of a new station based on, at least in part, the stations belonging to the same cluster, and wherein the mapping unit instead of exchanging the stations exchanges the new stations with the respective place. Hereby the number of stations can be reduced and the accuracy of the OD matrix can be improved. The OD sub-matrices and OD matrices also becomes easier to understand and analyze, both by humans and machines.

The station identification unit may be configured to determine a geographical position associated with each time stamp for a user ID as either a first condition indicating that a user equipment associated with the user ID is moving or a second condition indicating that the user equipment is stationary, and create a station if the geographical position is determined to be in the second condition with respect to a first time stamp and is determined to be in the first condition with respect to a second time stamp immediately following the first time stamp, and the second condition preceding a change to the first condition has been maintained for a longer time than a time threshold. Hereby is achieved that an unnecessary number of station generations can be avoided. This increases the accuracy, size and usefulness of the OD matrix.

The station identification unit may also be configured to calculate a mean value for the geographical position of the station based on, at least in part, consecutive geographical positions related to the second condition. Hereby is achieved that the geographical position of a station can be determined more accurately thus improving the accuracy of the OD matrix. In this case the station identification unit may be configured to calculate the mean value also based on, at least in part, the time between the time stamps associated with the second condition in such a way that a longer time between two consecutive geographical positions gives a higher influence on the mean value than if the time would have been shorter. Hereby is achieved that account is taken for real-life situations where the network data associated with a user ID may be sparse. For example, when a user equipment for wireless telecommunication is in active mode, either in a call or sending data, the base station the user equipment is connected to is typically logged twice a second in network, but when the phone is in idle mode, the information on which base station the user equipment is connected to is only logged about once an hour (this varies between carriers, but is usually between 20 minutes and 2 hours).

The invention also relates to a computer system comprising at least one computer according to the two alternative main computer configurations above.

The computer system may utilize Hadoop map/reduce for generating the OD matrix. In that case the computer system comprises a master computer connected to the at least one computer, which in the computer system then is a slave computer. Hereby an architecture that is scalable is achieved, thus enabling the processing of big network data sets, which in turn improves the accuracy of the OD matrix.

Furthermore the invention relates to a method performed by a computer system for generating an OD matrix based on, at least in part, network data associated with a plurality of user IDs. In some embodiments, the method comprises the steps of: receiving user IDs, cell IDs and time stamps associated with the cell IDs and the user IDs; requesting and receiving, from a cell ID database, geographical coordinates corresponding to the cell IDs; finding stations and times for each user ID based on, at least in part, the geographical coordinates and time stamps associated with each user ID; exchanging the stations with a place for each one of the stations; generating at least one OD sub-matrix for each user ID based on, at least in part, places and times of arrival and departure associated with the places; and merging the OD sub-matrices into the OD matrix.

The method may comprise the step of storing the OD matrix in a non-volatile memory.

The method may comprise the step of adjusting times of arrival and/or departure from the stations by a linear extrapolation based on, at least in part, data time stamped between the stations.

The method may comprise the steps of: clustering the stations into at least two clusters, and calculating, for each one of the clusters, a position of a new station based on, at least in part, the stations belonging to the same cluster, and instead of exchanging the stations exchanges the new stations with the respective place.

Moreover the invention relates to a user equipment, e.g. a mobile telephone, for supporting generation of an OD matrix based on, at least in part, network data associated with a plurality of user IDs. The user equipment comprises: a unit for receiving or retrieving geographical coordinates and associated time stamps; a station identification unit for finding stations and times; a mapping unit for exchanging the stations with a place for each one of the stations; an OD matrix generating unit for generating at least one OD sub-matrix based on, at least in part, places and times of arrival and departure associated with these places; and a sending unit for sending the OD sub-matrix to a computer system.

The unit for receiving or retrieving geographical coordinates and associated time stamps may also be configured to receive or retrieve a user ID associated with the user equipment or a user of the user equipment. The sending unit may be adapted to send the user ID along with the OD sub-matrix.

The user equipment may comprise a time adjustment unit for adjusting times of arrival and/or departure from the stations by a linear extrapolation based on, at least in part, data time stamped between the stations.

The user equipment may comprise: a clustering unit for clustering the stations into at least two clusters, and a calculation unit for calculating, for each one of the clusters, a position of a new station based on, at least in part, the stations belonging to the same cluster, and wherein the mapping unit instead of exchanging the stations exchanges the new stations with the respective place.

The invention also relates to a computer program product for generating an OD matrix based on, at least in part, network data associated with a plurality of user IDs. In some embodiments, the computer program product comprises a non-transitory computer-readable medium storing a computer program for execution by a processor. In some embodiments, the computer program includes: code units for requesting, from a cell ID database, geographical coordinates corresponding to the cell IDs; code units for determining, for each of a plurality of user IDs, stations based on, at least in part, geographical coordinates and time stamps associated with each user ID; code units for exchanging the stations with a place for each one of the stations; code units for generating at least one OD sub-matrix associated with each user ID based on, at least in part, places and times of arrival and departure associated with the places; and code units for merging the OD sub-matrices into the OD matrix.

The invention also relates to a computer program product for supporting generation of an OD matrix based on, at least in part, network data associated with a plurality of user IDs. In some embodiments, the computer program product comprises a non-transitory computer-readable medium storing a computer program for execution by a processor. The computer program may include: code units for receiving or retrieving geographical coordinates and associated time stamps; code units for finding stations; code units for exchanging the stations with a place for each one of the stations, code units for generating at least one OD sub-matrix based on, at least in part, places and times of arrival and departure associated with the places, and code units for sending the OD sub-matrix to a computer system.

BRIEF DESCRIPTION OF THE DRAWINGS

The objects, advantages and effects as well as features of the above mentioned embodiments will be readily understood from the following detailed description of the embodiments when read together with the accompanying drawings, in which.

DETAILED DESCRIPTION

Figure 1:
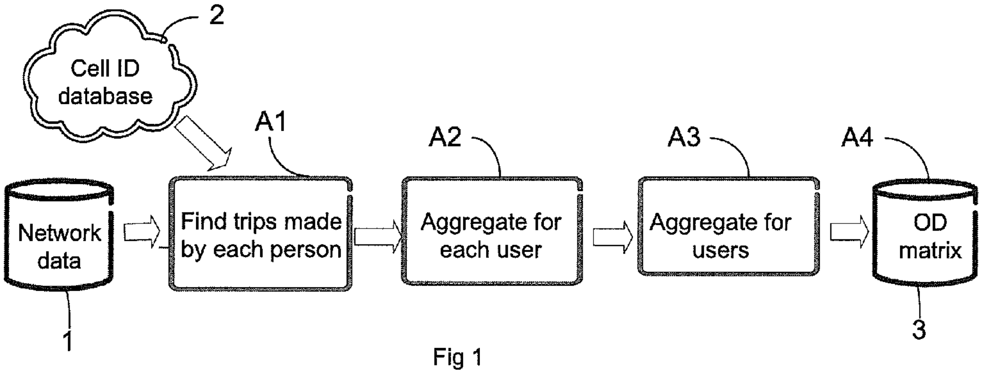
FIG. 1 is a general illustration of a method.

The embodiments below cover various modifications and alternative implementations, and will hereinafter be described in detail. However it is to be understood that the detailed description and drawings are not intended to limit the general inventive idea to the specific forms disclosed.

Embodiments for generating OD matrices using telecommunications network operator data/information, in the following called network data, will be disclosed in the following. The telecommunications networks could of course be a GSM (Global System for Mobile Communications) network, a UMTS (Universal Mobile Telecommunications System) network, an LTE (Long Term Evolution) network or any future telecommunications network according to e.g. any 3GPP (3rd Generation Partnership Project) telecommunications standard. An important component for building knowledge of human mobility is to discover where and when people or vehicles go from one specific place to another specific place. From the network data knowledge of human mobility can be drawn and the network data could therefore be used for a number of different use cases/purposes. A technical problem solved by at least one embodiment described herein is how useful information/data about origin and destination of trips as well as their numbers, can be extracted from the network. Another technical problem solved by at least one embodiment described herein is to enable ways of making it easier for people to draw conclusions about how people and vehicles travel based on, at least in part, network data. The raw network data is available, but until this invention, the methods and means of how to extract this information did not exist.

Throughout this document the word "plurality" shall be interpreted as "at least two". Other terms that are used below include:

(1) station/stationary point: origin or destination;

(2) origin and destination: A station comprising the geographical coordinates longitude and latitude (and optionally altitude) in which vicinity a person spends a certain/predetermined amount of time. This means that a station has no relation in the system to be described to a physical place (before it is mapped to a place); it is just an approximate location of where a person has been stationary during the certain time, which may be set differently for different stations.

(3) trip: A Trip is a data set comprising at least an origin and a destination as well as time of departure from the origin and time of arrival at the destination.

(4) place: A place comprises a name or some sort of identity and the geographical coordinates for longitude and latitude and optionally altitude. It is however not the same as a station, but more related to a real world place, such as a building, a park, a train station, a bus stop, a taxi stand etc. A city or a larger geographical area could also be a place in some embodiments.

(5) OD matrix: An OD-matrix comprises a set of places, and a number for each (sorted) pair of places that represents how many people/user traveled from the first to the second place (within a certain specified time-frame). An OD matrix is according to the disclosure herein a two-dimensional matrix with places on each axis or a three-dimensional matrix with places on two of the axis and time periods on the third axis. However, the skilled person understand that the form and in which way the OD matrix is stored in a computer memory is different in different implementations in dependence of how the OD matrix is going to be utilized. Even though the OD matrix may be stored and shown as a graphical image, it is in many embodiments more convenient to store an OD matrix as a list or table (a data set) with the following data: [place 1 of departure, place 2 of arrival, the number of people who have traveled from place 1 to place 2], [place 1 of departure, place 3 of arrival, the number of people who have traveled from place 1 to place 3] . . . . An OD matrix can be said to be a more aggregated form of an OD estimation or OD sub-matrices. An example is also illustrated and discussed more in detail in FIG. 6.

(6) user ID: The user ID (identity) mentioned in this disclosure is anything that could be used to differentiate another user and/or UE (user equipment) from each other. Examples of types of user IDs are identities that are associated with a SIM (Subscriber Identity Module) card such as IMSI (International Mobile Subscriber Identity) or associated with a specific UE such as IMEI (International Mobile Equipment Identity). Other types of user IDs are OAuth (Open Authorization), e-mail address, MSISDN, and MAC (Media Access Control) address, but also customer numbers used by a telecommunications network operator for its customers. The user ID could also with respect to privacy and anonymity be generated by transforming a user ID received from a network operator to a user ID created for the sole purpose of the generation of an OD matrix.

FIG. 1 is a flow chart illustrating an overview of an embodiment of a method. Here network data 1 is received from an entity having the network data. The received network data 1 could be streamed from the entity or sent in batches, e.g. in the form of data sets. The received network data 1 comprises at least one event/information set in dependence of whether the network data 1 is received in a streamed fashion or sent in batches. Each information set comprises a user ID, network cell identity (hereinafter called cell ID) and an associated time (typically a time stamp). The received cell ID is the identity of a current cellular network cell in which a mobile UE of a user is or at a certain time has been positioned. Optionally, geographical coordinates corresponding to the cell ID can then be retrieved from a cell ID database 2. Trips, or rather stations and time of departure and arrival associated with the stations, made by each one of a group of people are found in a step A1 using user ID retrieved from the network data 1, associated time and either the cell ID or its geographical coordinates. The trips are thus recognized via the network data generated by the use of mobile UEs, such as mobile phones or computer tablets with cellular telecommunications capability. Having identified stations made by individual people, the stations for each user ID are aggregated in a subsequent step A2. The step A2 may also comprise the mapping of stations to places. Then the trips/stations for each one of the user IDs are aggregated/merged in step A3 and one OD matrix 3 or more OD matrices are generated and stored in a computer memory.

Figure 2:
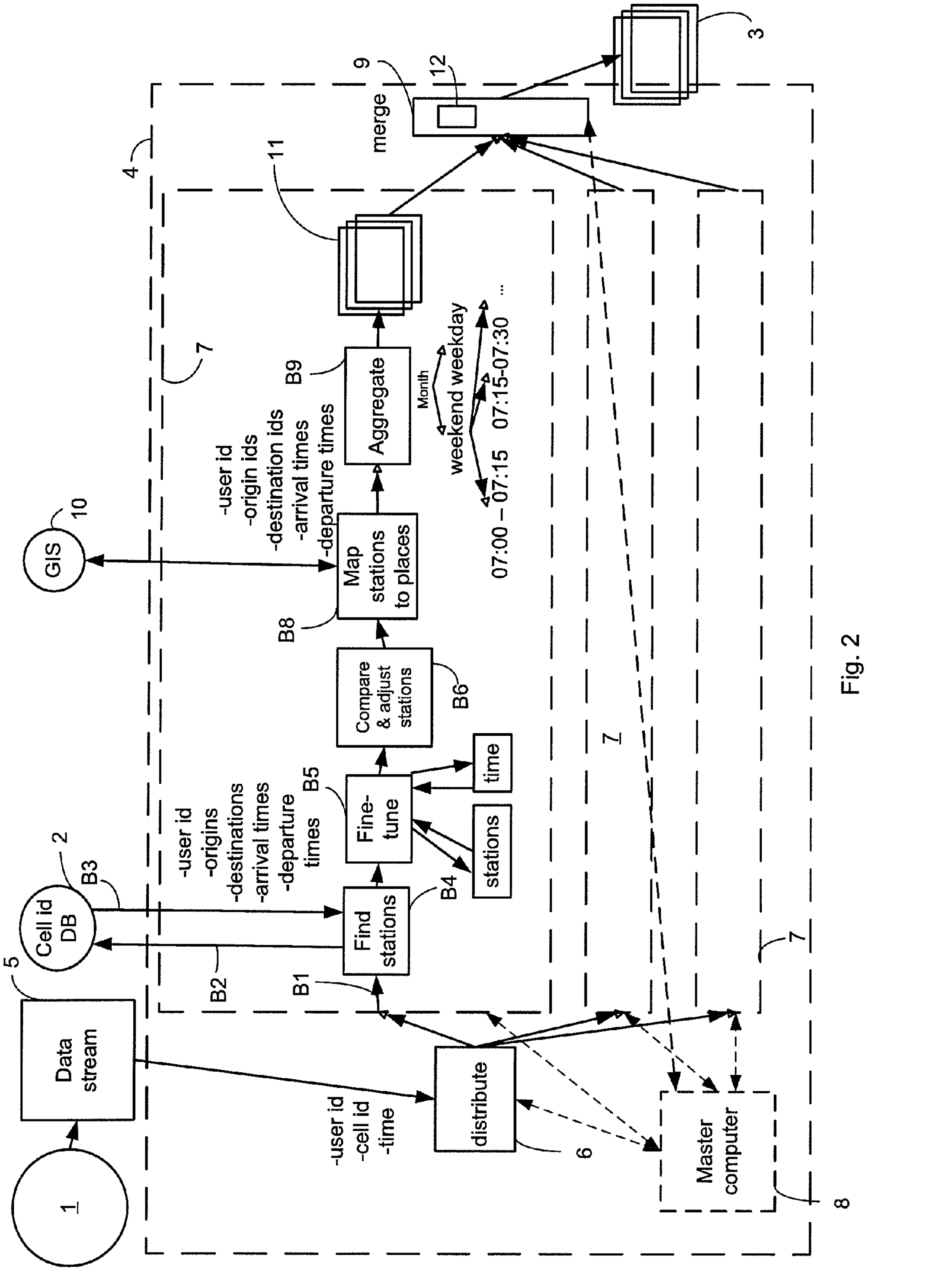
FIG. 2 is a more detailed illustration of an embodiment of the method.

A more detailed embodiment of the method is illustrated in FIG. 2. In the illustrated embodiment, the method is implemented with the help of a distributed computer system 4. The network data 1 is here streamed from a first computer/server 5, which may be owned by a cellular network operator, to a second computer/server 6. The second computer 6 here belongs to the computer system 4 and distributes the network data 1 among a group of third computer/servers 7 which also are comprised in the computer system 4. The distribution is thus scalable and more easily adapted to large amount of data in that the third computers 7 can work in parallel. One way for the distribution is to utilize/implement Hadoop map/reduce with a master computer 8 as jobtracker. The master computer 8 may belong to the computer system 4 as well and in such an embodiment uses both the second computer 6 and the third computers 7 as slaves/tasktrackers. The number of parallel third computers 7 may be every number from two computers to several thousands using Hadoop map/reduce. As also indicated in FIG. 2, the master computer 8 also communicates with at least one fourth computer 9 for merging/aggregating OD matrices for a plurality of user IDs. The fourth computer 9 is in this Hadoop example also a slave and belongs to the computer system 4. In one embodiment an Hadoop cluster of 10 computers are used, where each slave computer process data associated with several user IDs. As also should be clear to the person skilled in the art of Hadoop implementation, the second computer 6 and the fourth computer 9 typically are not computers that only distribute tasks and merge OD matrices respectively, but they could also perform tasks which in the following are described as being performed by the third computers 7. In other words, one or more of the third computers 7 may also perform the tasks which in the following are described as being performed by the second computer 6 and the fourth computer 9 respectively.

FIG. 2 illustrates the steps made by one of the third computers 7, but it is apparent that the same steps are or could be made by the other third computers 7, the second computer 6 or the fourth computer 9. As also illustrated in the flow chart of FIG. 3 as step B1, the third computer receives events/information sets, each event comprising at least a cell ID, a time/time stamp and a user ID. The cell ID corresponds to which base station/Base Transceiver Station (BTS) the UE was connected to at the given time provided by the time stamp. By sending, in step B2, the cell ID to the cell ID database 2 for a cell ID lookup, i.e. a cell ID lookup request, the cell ID information is transformed by the cell ID database 2 into longitude and latitude coordinates, and optionally if the cell ID database happen to have altitude coordinates, also an altitude coordinate. Cell ID databases with an altitude coordinate is perhaps maybe not commercially available today, but may in the future be useful for e.g. distinguishing people waiting for a metro train at one level and other people waiting for another train at another level on the same metro station. The cell ID database 2 is here illustrated as being an external entity from the third computer, but it may of course be positioned in the third computer. In a step B3 the geographical coordinates are received by the third computer from the cell ID database 2 via a cell ID answer message. In one embodiment the cell ID lookup request is sent as an HTTP (Hypertext Transfer Protocol) request and the answer message received as an HTTP response. In another embodiment the cell ID look up can be made via an API (Application Programming Interface) such as location-API provided by the company Combain Mobile AB.

Even if steps B2 and B3 are illustrated as being performed by the third computers 7 in FIG. 2, these steps may in other embodiments of the computer system 4 be performed by one or more separate computers (not shown) which send the user IDs, the time stamps and the geographical coordinates to associated third computers 7.

Finding Trips/Stations

Figure 3:
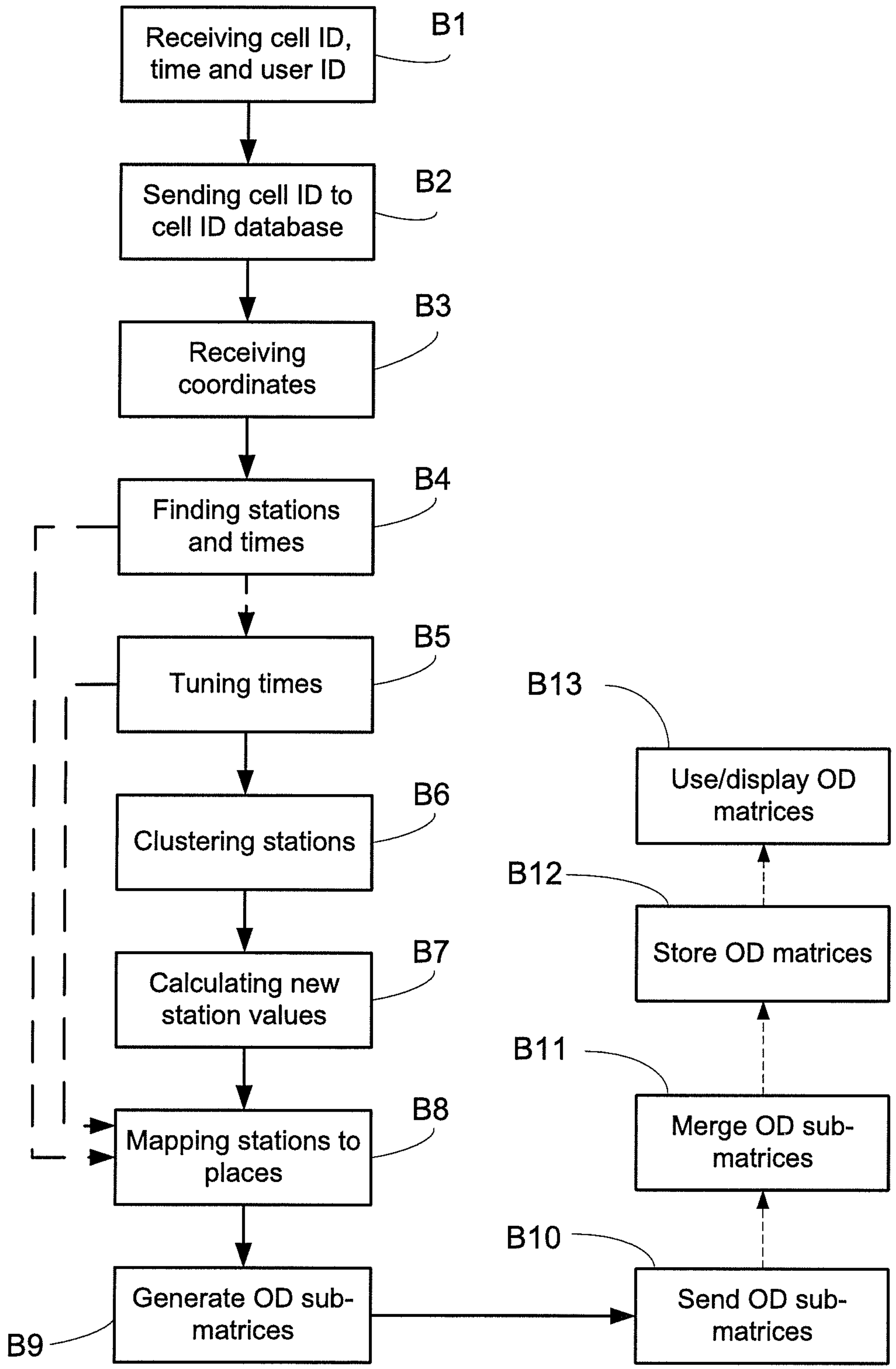
FIG. 3 is a flow chart illustrating steps according to an embodiment of a method.

In a step B4, illustrated both in FIGS. 2 and 3, stations are found among the network data 1 and the associated geographical coordinates received from the cell ID database 2. In other words, the trips are here found without any knowledge of the location of any cities etc. This step B4 comprises the finding of all stations made by each user, of course supposing that each individual carry their mobile UE. Input network data 1 available for the user is evaluated, including user ID, time stamps and corresponding longitude and latitude. All stations associated with the user/UE are then output from this step/function. Finding trips might seem like an easy task, but the input data may be very sparse and with much fluctuations even if a person is perfectly still. It has for example been noticed that even in a stationary condition, the UE may switch base station up to 6 times with only a few seconds connected to each base station.

Figure 4:
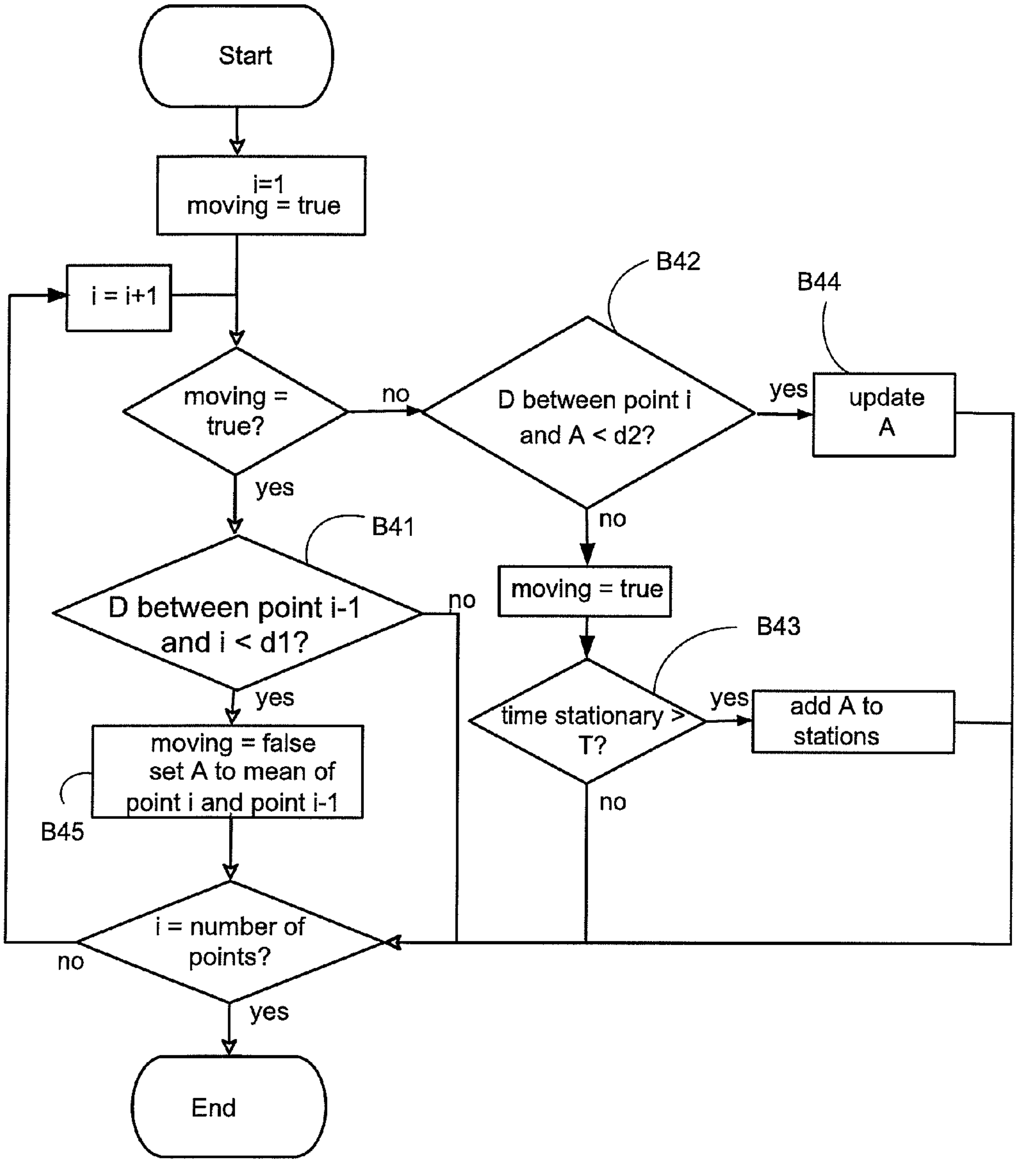
FIG. 4 is a flow chart of an embodiment of how a computer is able to find stations and associated times made by a person.

An embodiment of this step B4 is illustrated in more detail in FIG. 4. The step B4 is here an iterative process and defines each point, i.e. each geographical position associated with a time stamp for the user ID, as either a first condition here referred to as “moving” or a second condition here referred to as “stationary”. As indicated in a sub-step B41, if a previous point in time (i−1 in FIG. 4) is a moving point, then the new point (i in FIG. 4) is defined as stationary, if it is geographically close enough to the previous point, i.e. a geographical distance D between the points is within a predetermined first distance threshold d1. As indicated in a sub-step B42, if the previous point is stationary, then the current/new point is stationary if it is close to a mean value position A (in FIG. 4) of all stationary points preceding it and if there is no “moving” points in between. In other words, the current point is stationary if the previous point i−1 is stationary and the distance D between the position of the current point i and the mean value position A of all the other stationary points after the last moving point is within a second distance threshold d2.

If the previous point is a stationary point and the new point is defined as moving, a station is created if the UE has been stationary longer than a certain time threshold T. In other words, the time difference between the current point and the earliest stationary point after the last previous moving point is here compared with the time threshold T and if the time difference is larger than the time threshold T, the station is created. This is indicated as sub-step B43 in FIG. 4. In an alternative embodiment of the sub-step B43, the time difference is calculated as being the time between the time of the earliest stationary point after the last previous moving point and the time of the point just before the current (moving) point. The geographical coordinates of the station is set as the mean value A. This embodiment of step B4 thus has three variable parameters: two distance thresholds, d1 and d2, and one time threshold T. The skilled person understands that the optimal values for the distance thresholds d1 and d2 and the time threshold T can be set according to a specific use case and/or geographical area. The skilled person appreciates that there would or at least could be differences between a rural area and a big city area. The distance thresholds d1 and d2 may have the same value in one embodiment of step B4. In one embodiment the distance thresholds d1 and d2 are set to 1000 meters and the time threshold T to 10 minutes. It should also be mentioned that more thresholds may be used in other embodiments of step B4, for example an additional time threshold which has to be passed for two stations to be counted as two separate stations. Another example is to add a minimum travel time or a minimum travel distance as another or additional way of separating stations in time or distance.

FIG. 4 should be self explanatory to the skilled person, but in order to avoid any possible confusion, a sub-step indicated as B44 “update A” should be mentioned. In this sub-step the mean value A of a possible station is here recalculated, taking the longitude and latitude of point i into account as well. In other words, if A has been calculated as the mean value of the coordinates of only two points in a sub-step B45, this A is in sub-step B44 recalculated, e.g. by calculating A as the mean position of the three points. The mean value A thus can be seen as a vector comprising the values of at least longitude and latitude. The calculation of the mean position A may in one embodiment be done by giving each point an equal weight, but in another embodiment the mean value A may be a weighted value/average by taking the time between points into account. For example, if a person is in a call, there might be only a second or less between points, but when the call ends and the phone enters a non-active/idle mode, there might be e.g. 30 minutes between points. Points can therefore be weighted in such a way that a longer time between two points gives a relatively high weight, e.g. a weight which is linearly proportional to the time between the corresponding points. In an embodiment the weighted mean value A may be calculated as being:

$$A=(\text{sum\_}i\; p\_i{*}t\_i)/(\text{sum\_}i\; t\_i)$$

where sum_i means that it is a sum over i, p_i is point i and t_i is the time between point i and point p_(i+1). Alternatively, t_i can be the time between p_i and p_(i−1), or (p_(i+1)+p_(i−1))/2.

Since A here is a vector, the calculation is done over each vector component, i.e. with respect to at least longitude and latitude.

All the generated stations together with the associated arrival times and departure times and user ID from each one of the stations are output from step B4.

Fine Tuning Arrival Time and/or Departure Time

Figure 5:
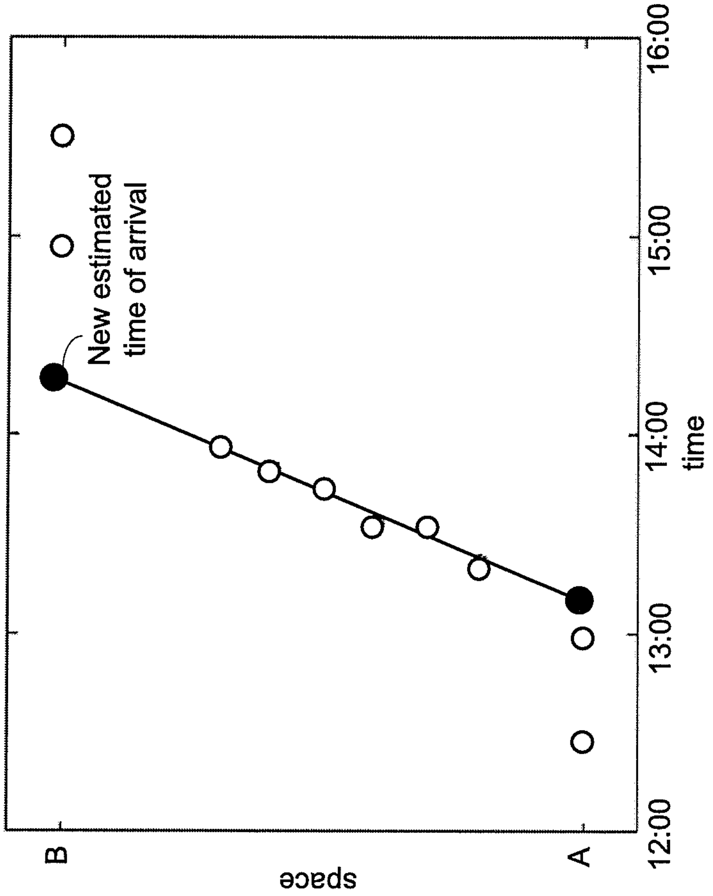
FIG. 5 illustrates an adjustment of an arrival time at a station.

Since there are a lot of fluctuations in a cellular telecommunications network and its generated network data even if a person is standing still, the distance thresholds d1 and d2 may have to be set quite long in order to not erroneously determine a stationary user/UE as moving. Therefore, when a user starts moving with his/her UE, he/she might be classified as stationary for a while longer than he is in reality. Hence the actual time of departure and arrival might not accurately correspond to the time between a stationary point and a moving point determined in step B4. In an optional tuning step B5, the departure times and arrival times are re-determined/fine tuned/adjusted. By analyzing the points belonging to a station, it is possible to better predict when the user actually left the place. One way of doing this is by utilizing an extrapolation method, e.g. a linear extrapolation as illustrated in FIG. 5. In the illustrated example, the X-axis is time and the Y-axis is distance. All the white points are points based on, at least in part, the received network data 1 and the determination of stations and times of arrival and departure in step B4. If a departure time from station A would have been determined based on, at least in part, the white points, it would be about 13:00, and the arrival time at stations B would be about 15:00. However, with the illustrated linear extrapolation based on, at least in part, the white points in between, the departure time from station A would be about 13:15 and the arrival time at station B about 14:15. The use of the linear extrapolation could in step B5 be used for fine-tuning the arrival and departure times of all trips, but in other embodiments of the optional step B5 be utilized for trips which fulfills certain criteria, such as trips having a length above a certain time threshold and or having a certain number of “moving” points between the two stationary points. In FIG. 5, the number of “moving” points is six.

Clustering Stations

Sometimes the points might be very sparsely distributed in time, and there might only be a few points defining a station. This may result in a very or relatively poor estimate of where the user has been stationary. Since a user often visit a place more than once, all stations belonging to a user may be compared to determine more accurately where the user actually has been. This is done with the help of the optional step of B6. As input the function/step takes all the stations identified in step B4 and belonging to a user ID. The stations are then grouped together using a clustering method, e.g. any clustering method where the number of clusters does not have to be specified beforehand. A suitable clustering method is a mean shift clustering. The advantage of the mean shift clustering method is that it doesn’t require any a priori knowledge of the number of clusters and does not constrain the shape of the clusters. More information about the mean shift clustering could be retrieved e.g. from http://homepages.inf.ed.ac.uk/ rbf/CVonline/LOCAL_COPIES/TUZEL1/MeanShift.pdf, retrieved on 14 Jul. 2011, and hereby incorporated by reference.

Examples of alternative clustering methods are density clustering methods and hierarchical clustering methods. Step B6 may in one embodiment be performed before or in parallel with the tuning step of B5, even though it is illustrated in FIG. 3 as being performed after the tuning step B5. The clustering step B6 may be configured in such a way that it rather fails to group two stations that should be grouped together than grouping two stations that should not be grouped together.

Calculating New Position for Stations

In embodiments where step B6 is performed, a seventh step B7 follow in which each cluster is determined to be a new station which replaces the stations on which it is based, i.e. the stations generated in B4. The position of the new station/cluster may be calculated in this step B7 to be the mean position of the positions of all stations from step B4 included in the same cluster. All the new stations as well as their calculated position and time of arrival and departure are forwarded to the next step B8.

Map Stations to Places

In order to make an OD-matrix which is relatively easy for a human to understand, the stations have to be aggregated into something that is easier to overlook and draw conclusions from. This can be done in two different ways, either with or without a priori knowledge about what places to look at.

The advantage of having defined what places to look at, is that the assigning of a station (from either step B7, B5 or step B4 in dependence of embodiment) to a place is easy and fast and there is always a name for each place assuming that names are provided. The disadvantage is that stations might be grouped together into a place in a way that doesn't really reflect the way they might be intuitively clustered in the real world by a human or organization/company.

What places to look at can either be defined manually or obtained from one or more GIS (Geographic Information System) 10, for example OpenStreetMap, Google earth and Google maps. In FIG. 2, the GIS 10 has been illustrated as being hosted by an external server, but it might of course be hosted by one or more of the third computers 7 or another computer of the computer system 4. API messages or HTTP messages may typically be used in the communication with the GIS, e.g. one of the APIs for Google map.

In this eighth step B8, the third computers 7 maps each station, i.e. either the new stations from step B7 or the station from step B4 or B5 in dependence of embodiment, to one of the provided places. The skilled person understands that there are different ways to do it. For example, if the provided places from the GIS 10 are provided with longitude and latitude, the places will be associated with stations, if the geographical coordinates of the stations are within a certain distance from the position of the place. Another way is to just assign each station to the nearest place. The skilled person appreciate that there are other ways of doing this as well, but it should be made clear that not all embodiments of this step requires that all stations should map to a place. Some stations may simply be regarded as not being related to any place and therefore should or could be removed.

Aggregate/Generate OD Sub-Matrices

In a ninth step B9, at least one OD sub-matrix 11 is created by the third computer 5. One way of generating an OD sub-matrix is to create a square matrix with element at position i,j representing the number of trips between the place with index i and the place with index j. To save more information from the previous steps, a separate OD sub-matrix can be created for each time-period of interest. For example, one OD sub-matrix can be created for all trips starting between 07:00 and 08:00 on a weekday in January, and another OD sub-matrix for all trips starting between 14:00 and 15:00 on weekends in March etc.

How to aggregate the time intervals could either be manually defined, using a configuration file, or by monitoring statistics from the data stream node, i.e. the first computer 5. The statistics may make it possible to discover that there are certain patterns in the ability to move in the data sets. Based on this data, a certain number of groups may be defined, such as night, morning, morning traffic, lunch, evening traffic, evening, etc. This information may help to aggregate the data into more realistic groups, rather than by a hardcoded split on hours. It should be recalled from the above discussion about different Hadoop implementations that even if at least one OD sub-matrix is generated for a user ID in one of the third computers 7 and that the OD sub-matrix then is forwarded to the fourth computer 9 (see a tenth step B10 below), there are alternative embodiments where the OD sub-matrix is temporarily stored in the third computer in order to await the generation of further OD sub-matrices for other user IDs in the same computer and that the computer then merges a plurality of its generated OD sub-matrices for the different user IDs into a more aggregated OD sub-matrix.

Merging OD Matrices from Different Computers

In the tenth step B10, the third computers 7 send their OD sub-matrices to the fourth computer 9, which in an eleventh step B11 merges OD sub-matrices from the third computers 7 into at least one OD matrix 3. In an Hadoop implementation, the merging can be seen as the reduce phase of Hadoop map/reduce.

Figures 6, 12:
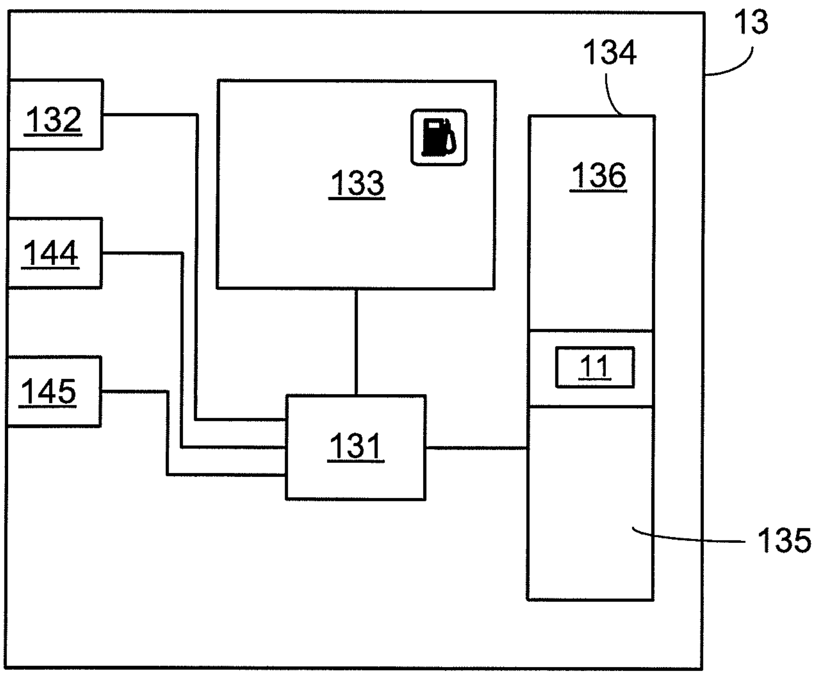
FIG. 6 is an illustration of an OD matrix.
FIG. 12 illustrates an embodiment of the UE according to FIG. 11.

FIG. 6 is an illustration of a small OD matrix 3, where P1-P8 are places and the values in the matrix are the number of trips from one place to another in a specific time interval, e.g. the time interval of 8:00 am to 8:30 on a particular date. In this example there are 310 people who have traveled from origin P4 to destination P6. Here trips made from one and the same origin and destination, if any, are not shown or deemed to be invalid and therefore have been removed. On the other hand, there are use cases where it would be beneficial to see also such information. Such use cases could for example be to see the sleeping or staying habits in an area, where people go to work in the morning and then go back in the evening for sleeping; a taxi stand monitoring to see the frequency of taxi cars coming back to the same taxi stand; and lunch time habits of people.

In a twelfth optional step B12, the "merged" OD matrices of step B11 are stored in a non-volatile memory 12 in the fourth computer 9 and/or a further computer (not shown).

Use Cases

In an optional thirteenth step B13, the OD matrices are used in some ways. One such use could be to make them available for display on a computer screen or be printed on paper. Other types of use could be to retrieve the OD matrices from the non-volatile memory 12 and use the OD matrix data as input to an application for further graphical processing in order to, for example, show the most used origins and destinations on a map or other ways of visually showing the most popular trips made by people at a certain time interval.

Another use case is for the purpose of planning the building of infrastructure such as metros and monorails to support the need of transportation in high density populations and big cities like Chennai, India. Right now the knowledge of trips in Chennai is collected by people who manually count cars in cross roads. This is costly and takes a long time compared to the utilization of information according to the general principle outlined in this description where information about how people travel is derivable from information already inside the network data.

Other ways of utilizing the OD matrices is to plan car-pooling and so-called school pooling, where students living in the same area pool their ride in a taxi-like way of transportation. Yet other use cases are decisions for building of bridges and crossings, identification of unprotected railroad crossings and optimization of time schedules for bus routes. Still other use cases are the planning of tracks and rescue stations in rural and/or mountainous areas, where the network data can be really sparse and positions be relatively inaccurate due to, for example, large network cells.

Advantages

Some general advantages with one or more of the embodiments described above:

The data required for the general method above is already collected in the cellular network and doesn't require any extra installations on the UE. Infrastructure and information already present is thus used, increasing the value of the infrastructure and the information.

An OD matrix 3 can be obtained relatively fast and with a large sample size.

The comparison between trips made by a single user results in a more accurate estimation of the location where the user is stationary. The aggregation of the stations and mapping into places make the data more easily accessible and has as a useful side-effect in that it makes it much harder to identify a single individual.

About the Third Computers 7

Figure 7:
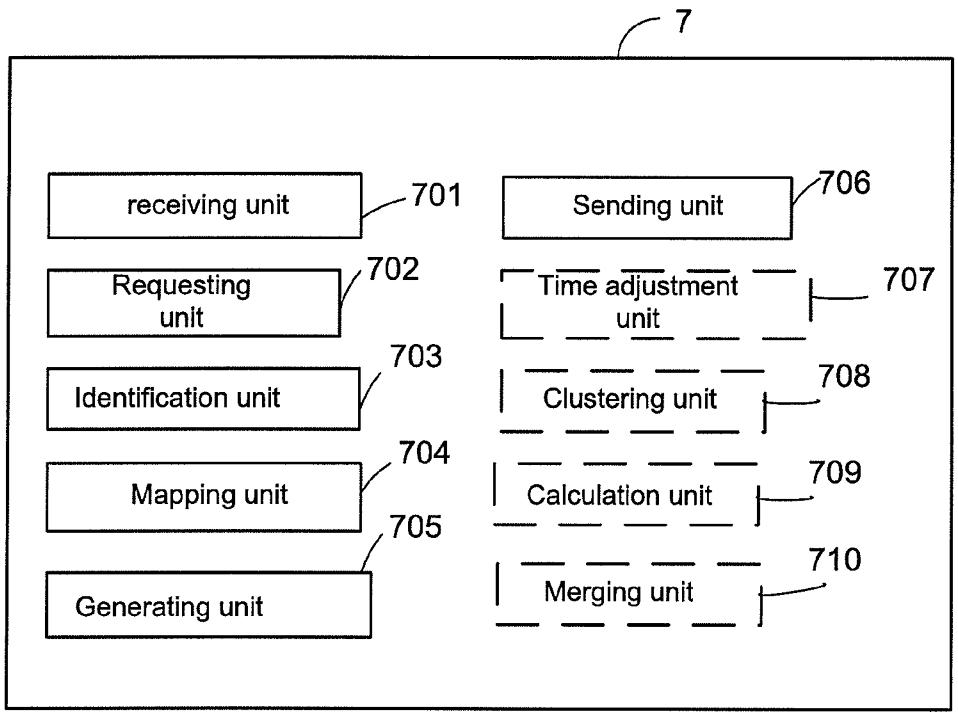
FIG. 7 illustrates different embodiments of a computer according to an aspect of the invention.
Figure 11:
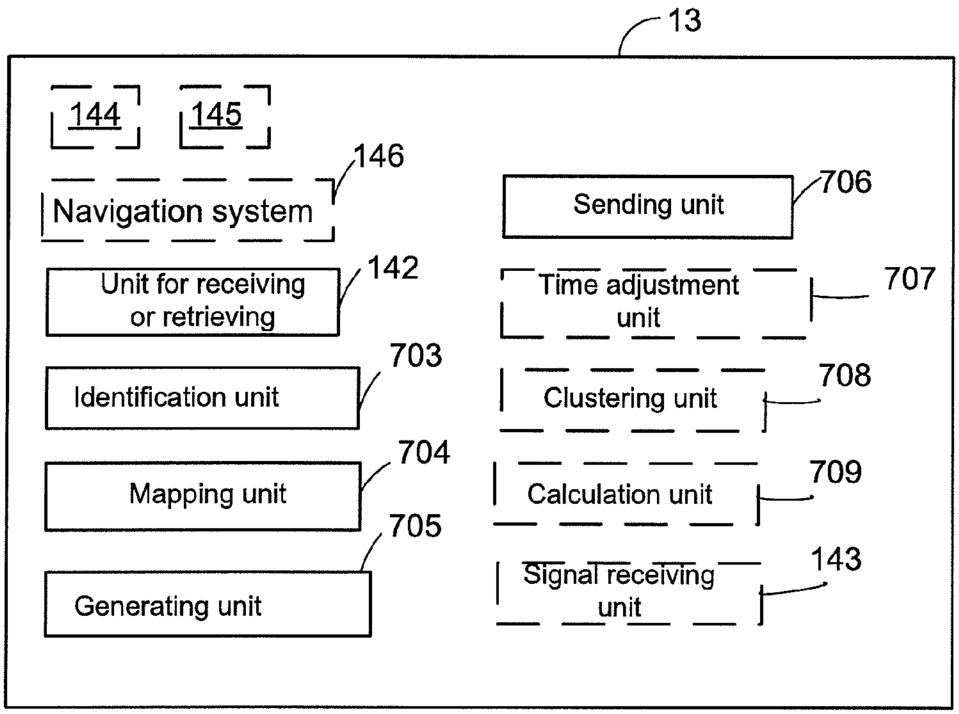
FIG. 11 illustrates different embodiments of a UE.

The third computers 7 illustrated in FIG. 2 comprise units in dependence of the above described embodiments of the method illustrated in FIGS. 1-5. Thus each one of the third computers 7 may comprise the following units, as illustrated in FIG. 7: (A) a receiving unit 701 for receiving user ID(s), cell IDs and time stamps associated with the cell IDs and user IDs (i.e. for performing step B1); (B) a requesting unit 702 for requesting and receiving, from an external or internal cell ID database, geographical coordinates corresponding to a cell ID (i.e. performing steps B2 and B3); (C) a station identification unit 703 for finding stations and times (i.e. performing step B4); (D) a mapping unit 704 for exchanging stations from the station identification unit 703 or from step B5 or new stations form step B7 with a place (i.e. according to step B8); (E) an OD sub-matrix generating unit 705 for generating at least one OD sub-matrix based on, at least in part, places and times of arrival and departure associated with these places (i.e. according to step B9); and (F) a sending unit 706 for sending the OD sub-matrix to another entity, such as the fourth computer 9 (i.e. according to step B10).

Alternatively or in addition thereto, the receiving unit 701 can be adapted to receive geographical coordinates associated with the time stamps and user IDs.

The third computers 7 may also comprise the following units in dependence of embodiment: (A) a time adjustment unit 707 for adjusting times of arrival and/or departure from stations, i.e. according to step B5; (B) a clustering unit 708 for clustering stations, i.e. according to step B6; (C) a calculation unit 709 for calculating a position of a new station based on, at least in part, clustered stations, i.e. according to step B7; and (D) a merging unit 710 for merging one or more OD sub-matrices associated with different user IDs.

The merging unit 710 may not only be adapted to merge OD sub-matrices created in the third computer, but may also be adapted to merge sub-matrices originating also from other third computers 7, even in order to create the OD matrix 3. Thus the third computer, as implied above in the description of the Hadoop implementations may act as both a third computer and the fourth computer 9.

Figure 8:
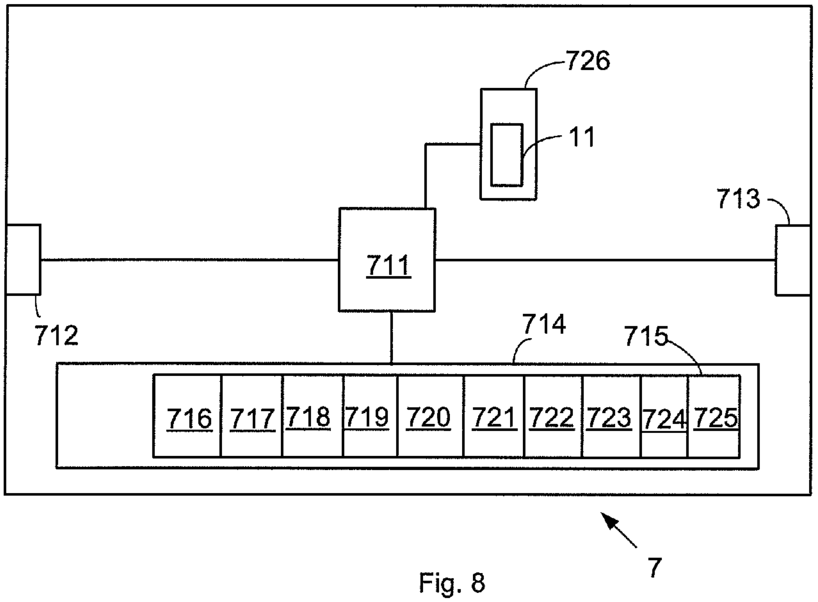
FIG. 8 illustrates an embodiment of a computer that performs at least a part of the steps described in this document.

FIG. 8 schematically shows an embodiment of the third computer in the form of a server. Comprised in the third computer is a processing unit 711, which can be a single unit or a plurality of units for performing different steps of the above embodiments of a method. The third computer also comprises an input unit 712 for receiving the network data 1 and an output unit 713 for the output of OD sub-matrices in step B10. The input unit 712 and the output unit 713 may be arranged as one, i.e. as a single physical port, in the third computer.

Furthermore the third computer in FIG. 8 comprises at least one computer program product 714 in the form of a non-volatile memory or volatile memory, e.g. an EEPROM (Electrically Erasable Programmable Read-only Memory), a flash memory, a disk drive or a RAM (Random-access memory). The computer program product 714 comprises a computer program 715, which comprises code units (or "computer instructions") which when run on the third computer causes the third computer to perform the steps according an embodiment of the method. In slightly other words, the computer program product 714 comprises computer readable code means on which the computer program 715 is stored. Hence the computer program 715 comprises at least six modules 716-721 corresponding to the units 701-706 respectively in order to perform the steps B1-B4 and B8-B10 when run on the processing unit 711. The computer program 715 may also, dependent on embodiment, comprise one or more of the four modules 722-725 corresponding to the four units 707-710 in order for the third computer to perform also one or more of the steps B5-B7 and the step of merging OD sub-matrices into a more aggregated OD sub-matrix or the OD matrix generated according to step B11. In other words, when the different modules 716-725 are run on the processing unit 711, the processing unit 711 together with the modules 716-725 in this embodiment is the receiving unit 701, requesting unit 702, the station identification unit 703, the time adjustment unit 707, the clustering unit 708, the calculation unit 709, the mapping unit 704, the OD sub-matrix generating unit 705, the sending unit 706 and the merging unit 710 respectively. Although the units in the embodiment disclosed above in conjunction with FIG. 8 are implemented as computer program modules, at least one of the units of FIG. 7 may in alternative embodiments be implemented at least partly as hardware circuits.

Another way of describing an embodiment of the third computer is to say that it is a computer comprising the processing unit 711 connected to the input unit 712 and the output unit 713, wherein the processing unit 711 is configured to perform at least the following functions: (A) receive a user IDs, cell IDs and time stamps associated with the cell IDs and user IDs, i.e. for performing step B1; (B) request from an external or internal cell ID database, geographical coordinates corresponding to a cell ID; (C) receive the geographical coordinates from the cell ID database; (D) find stations and tags associated with the stations, where the tags comprises arrival time and departure time from these stations; (E) replace/map the stations with places; (F) generate at least one OD sub-matrix based on, at least in part, places and times of arrival and departure associated with these places; (G) send the OD sub-matrix to another computer.

In one embodiment the processing unit 711 would also be configured to perform the functions: (A) adjust the arrival time and/or departure time from the stations; (B) cluster the stations into different clusters; (C) calculate a position of new stations, the position of each new station being based on, at least in part, stations in the same cluster to which the new station correspond; and (D) replace/map the new stations, instead of the original stations, with the places.

The third computer may of course also store OD matrices 3 or OD sub-matrices 11 in the computer program product 714 or in another memory 726.

The above described embodiments of a method, computers and the computer system 4 may of course be combined with other steps intended to further improve the accuracy/relevance of the OD matrix 3. Such additional steps could be to also take into account information provided by social networks, such as so-called check-in announcements by users/UEs via social network applications belonging to e.g. Facebook, Foursquare, Gowalla and Google+.

Having described a method being performed with the help of the computer system 4 comprising e.g. the second computer 6, one or more third computers 7 and the fourth computer 9, and in the case of a Hadoop implementation, also the master computer 8, another embodiment of the method shall now be described in conjunction with FIGS. 9 and 10. In this embodiment, a part of a method for generating OD sub-matrices 11 is performed in a UE 13, or rather more than one UE in parallel in order to get OD matrices 3 comprising trips made by more than one person.

An advantage of this embodiment in comparison with the processing of stations etc in the third computers 7 is that accurate positions can be more easily utilized by the method with the help of: (A) satellite based positioning systems such as GPS (Global Positioning System), Galileo, Glonass and COMPASS/Beidou; (B) local area networks and/or (C) proximity sensor systems such as RFID tags/NFC (Near Field Communication) tags associated with physical objects, such as buildings and shops.

Another advantage is that in use cases where the altitude is of interest, it can more easily be retrieved from e.g. a GPS signal receiver and/or an altitude meter (air pressure meter) in the telephone. Still another advantage is that it enables the sending of an individual OD matrix instead of raw data, which means that bandwidth costs are reduced and that the users can keep more raw data to themselves and hence reduce privacy risks. A drawback is that in practice (in so-called smartphones today) an application has to be installed in the UE 13, which means that the number of people on which OD matrices are based, may be smaller than what would typically be possible in the embodiments described in conjunction with FIGS. 2-8.

In an embodiment in which cell IDs are utilized, e.g. with the purpose of saving energy in comparison with a utilization of GPS, the UE 13 does not have to get the network data 1 from the second computer 6, but it already knows the cell ID of the current cell. In such an embodiment the UE 13 retrieves in a step C1 the already in the UE 13 stored cell ID of the network cell in which the UE 13 currently is positioned. Then in a step C2 the cell ID is sent to the cell ID database 2 in a similar way as in step B2 and receives the corresponding geographical coordinates in step C3 in a similar way as in B3.

In an alternative embodiment where GPS or a similar satellite-based system is utilized, the geographical coordinates are retrieved from a GPS receiver unit in the UE. This is illustrated as step C3' in FIG. 10.

A step C4 corresponds to step B4. The positions of the UE 13 can be input to the function of step C4 at regular intervals and/or triggered by predetermined events, such as when the UE changes cell or when an accelerometer comprised in the UE 13 indicates a value above a certain acceleration threshold. Another trigger could be the passing of a certain speed threshold, by comparing the speed threshold with an instantaneous speed calculated by a speed calculation unit of e.g. a navigation system.

Figure 9:
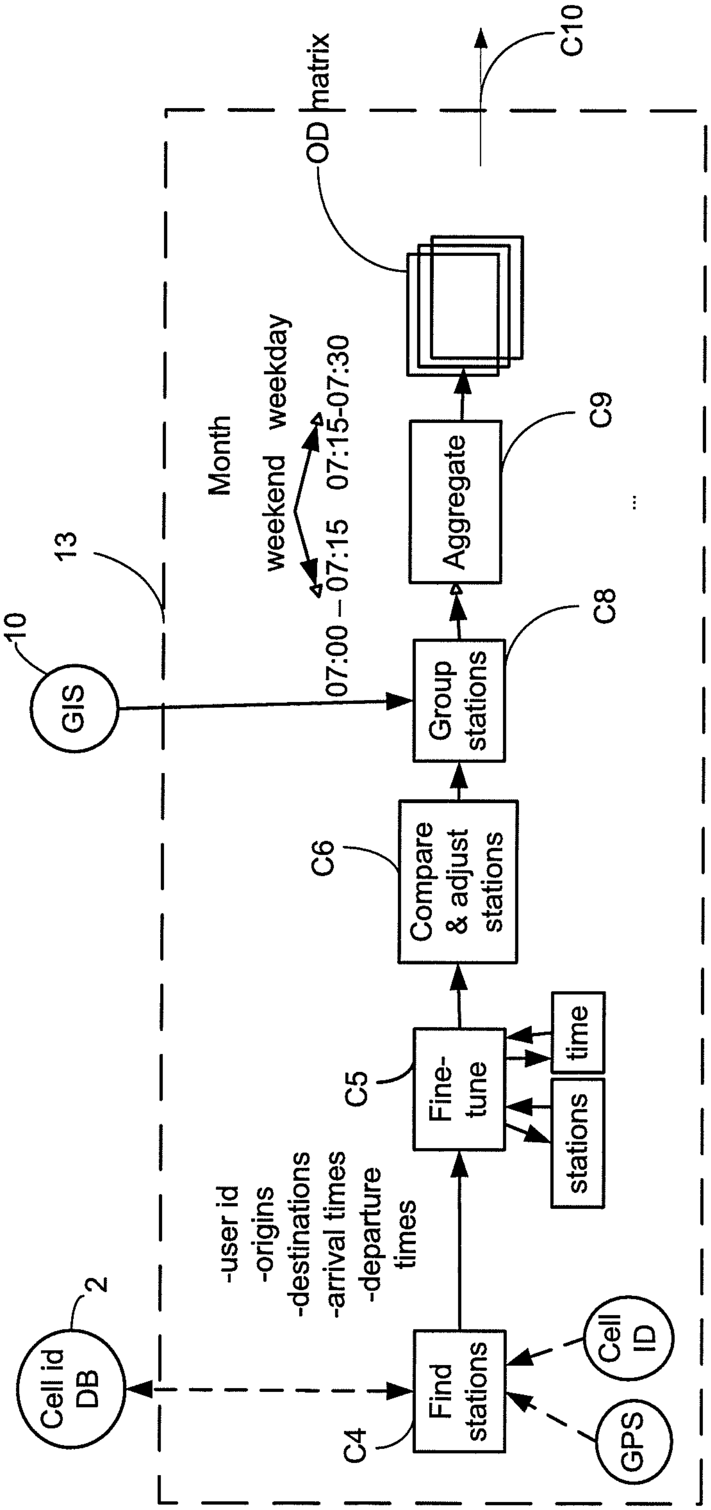
FIG. 9 shows a UE according to an embodiment.

As indicated in FIG. 9, the output from the step C4 may be the user ID, origins, destinations, arrival times and departure times. However, since it usually can be assumed, at least for a fairly long period such as a couple of months, that the user associated with the user ID has not changed, the user ID may not have to be involved in any of the following steps except perhaps in a last step C10 where at least one OD matrix is sent to a computer for merging of OD sub-matrices from different UEs. It may of course also be assumed in an embodiment where the IMEI is used as the user ID that the user ID never changes, and the user ID does in that case in some embodiments never have to be checked at all by the merging computer, since the merging computer does not have to know from which users received OD sub-matrices come from.

Steps C5, C6 and C7 are optional steps which correspond to the steps B5, B6 and B7 respectively.

A step C8 corresponds to step B8. Here the GIS 10 is illustrated as being a system in communication with the UE 13, but the system may in the form of, for example, a navigation system be stored in the UE 13 itself. C9 corresponds to step B9 and C10 corresponds to step B10. As touched upon above, the step of sending one or more OD sub-matrices from the UE 13 to a merging computer, such as the fourth computer 9, may or may not involve the sending of the user ID along with the OD sub-matrices.

About the UE 13

Figure 10:
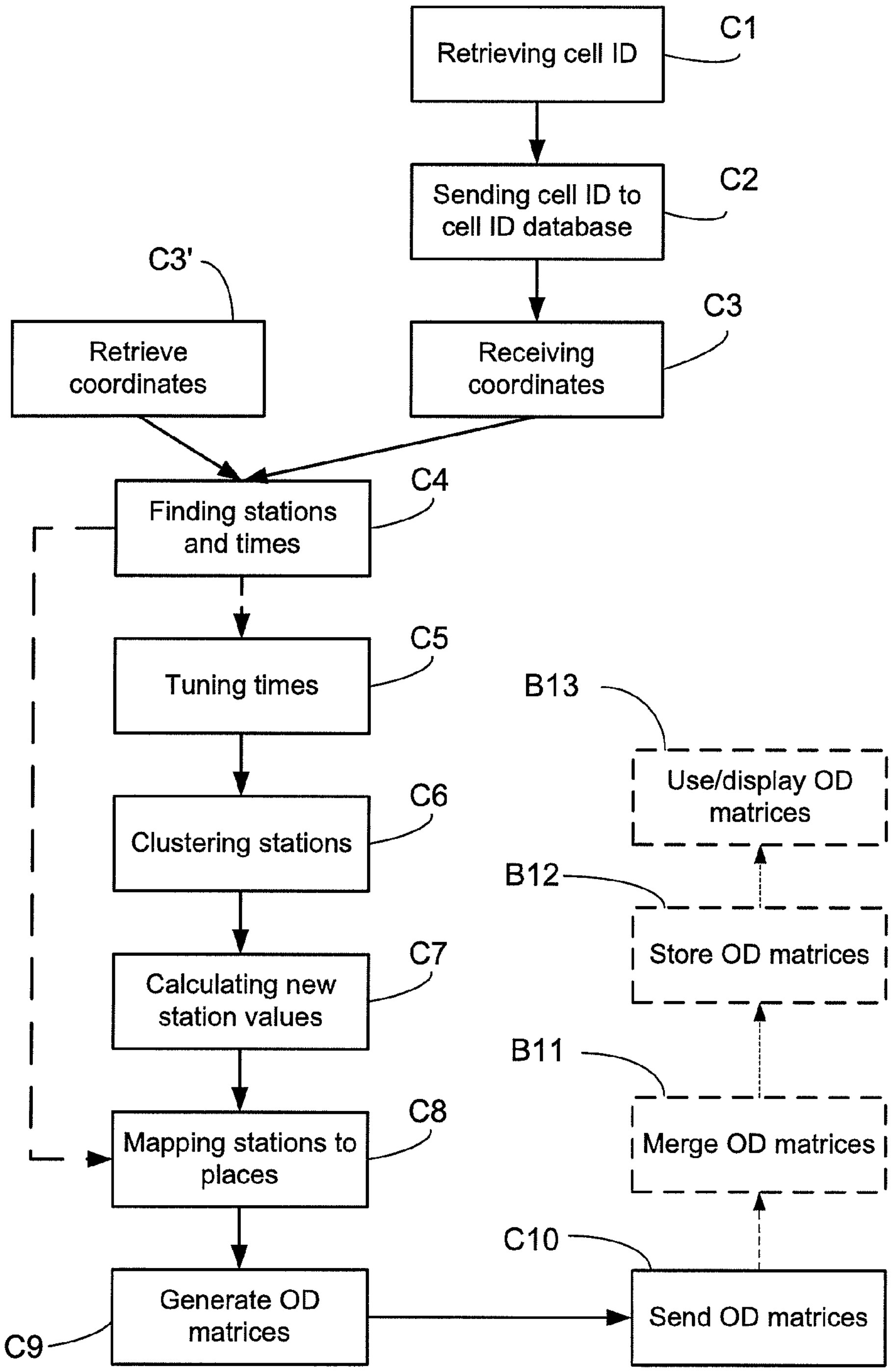
FIG. 10 is a flow chart illustrating steps according to an embodiment of a method for a UE.

The UE 13 illustrated in FIG. 9 comprises different units in dependence of the above described embodiments of the method illustrated in FIGS. 9 and 10. The UE 13 therefore comprises the following units: (A) a unit 142 for receiving or retrieving geographical coordinates, associated time stamps and optionally an associated user ID; (B) the station identification unit 703 for finding stations and times, i.e. performing step C4; (C) the mapping unit 704 for exchanging the stations or the new stations with a places respectively, i.e. according to step C8; (D) the OD matrix generating unit 705 for generating at least one OD sub-matrix based on, at least in part, places and times of arrival and departure associated with these places, i.e. according to step C9; (E) the sending unit 706 for sending an OD sub-matrix from the UE 13 to an external entity for merging with other OD sub-matrices from other UEs, wherein the sending unit here may or may not be adapted to send an associated user ID along with the OD sub-matrix, i.e. according to step C10. The external entity may be a computer of the computer system 4 adapted to merge OD sub-matrices into the OD matrix 3.

The UE 13 may according to the description above in conjunction with FIGS. 9 and 10 also comprise one or more of the following units, sensors and system: (A) a signal receiving unit 143 for a satellite-based position system; (B) an accelerometer 144; (C) an altitude sensor 145; (D) a navigation system 146; (E) the time adjustment unit 707 for adjusting times of arrival and/or departure from stations, i.e. according to step C5; (F) the clustering unit 708 for clustering stations, i.e. according to step C6; (G) the calculation unit 709 for calculating a position of a new station based on, at least in part, clustered stations, i.e. according to step C7.

FIG. 12 schematically shows an embodiment of the UE 13 in the form of a mobile phone. Comprised in the UE 13 is a processing unit 131, which can be a single unit or a plurality of units for performing different steps of the method described above in conjunction with FIGS. 9-10. The UE 13 also comprises a transceiver unit 132 for wireless communications with other devices. Illustrated here is also the accelerometer 144, the altitude sensor 145 and a display 133.

Furthermore the UE 13 comprises at least one second computer program product 134 in the form of a non-volatile memory, e.g. an EEPROM (Electrically Erasable Programmable Read-only Memory), a flash memory and a disk drive. The second computer program product 134 comprises an optional navigation system computer program 135, and a computer program 136 for generation of an OD sub-matrix according to at least one of the embodiments illustrated in conjunction with steps C1-C10. The computer program 136 comprises code units which when run on the UE 13 causes UE 13 to perform the steps according to any of the method embodiments of FIGS. 9 and 10. Hence the computer program 136 comprises program modules in order for the UE 13 to perform the steps C1-C10 when run on the processing unit 131. In other words, when the different modules of the computer program 136 are run on the processing unit 131, the processing unit 131 together with the modules of the computer program 136 in this embodiment are at least the unit 143 for receiving or retrieving, the station identification unit 703, the mapping unit 704, the OD matrix generating unit 705 and the sending unit 706 and optionally also the time adjustment unit 707, the clustering unit 708 and the calculation unit 709. The optional navigation system 146 corresponds to the navigation system computer program 135 when run on the processing unit 131.

Although the code units in the embodiment disclosed above in conjunction with FIG. 12 are implemented as computer program modules which when run on a UE causes the UE to perform steps described above in the conjunction with figures mentioned above, at least one of the code units/modules may in alternative embodiments be implemented at least partly as hardware circuits.

Another way of describing an embodiment of the UE 13 is to say that it is a UE comprising a processing unit 131 wherein the processing unit 131 is configured to perform at least the following functions: (A) receive the geographical coordinates from a positioning system in the UE and/or from the cell ID database; (B) find stations and tags associated with the stations, where the tags comprises arrival time and departure time from these stations; (C) replace/map the stations or new stations with places; (D) generate at least one OD sub-matrix based on, at least in part, places and times of arrival and departure associated with these places; (E) send the OD submatrix to another entity.

The processing unit 131 may also be configured to perform at least one of the following functions: (A) receive or retrieve cell IDs and time stamps associated with the cell IDs; (B) request from an external or internal cell ID database, geographical coordinates corresponding to a cell ID; (C) adjust the arrival time and/or departure time from the stations;

cluster the stations into different clusters; (D) calculate a position of new stations, the position of each new station being based on, at least in part, stations in the same cluster to which the new station belongs.

The UE 13 may of course also store OD sub-matrices 11, in the second computer program product 134 or in another memory in order to be able to send or resend the OD submatrix 11 at a later point in time and/or to be able to display the OD sub-matrix on the UE 13 itself or use the OD submatrix in another application stored in the UE 13. Such an application could be an application for keeping track of times and places where the user has been.

It should be understood that in case of software implementation, the methods, computer programs etc irrespective of whether it is a UE-implementation according to FIGS. 9-12 or a more centralized implementation like the one illustrated in FIG. 2-8, may be implemented with any suitable programming language. One such suitable language is Java.

The invention claimed is:

1. A computer for supporting generation of an OD matrix based on, at least in part, network data associated with a plurality of user IDs, comprising:

a receiving unit operable to receive a user ID, cell IDs and time stamps associated with the cell IDs and the user ID;

a requesting unit configured to request, from a cell ID database, geographical coordinates corresponding to a cell ID;

a station identification unit for determining stations based on, at least in part, the geographical coordinates and time stamps;

a mapping unit configured to, for each one of the stations, determine a place associated with the station;

an OD matrix generating configured to generate at least one OD sub-matrix associated with the user ID based on, at least in part, places and times of arrival and departure associated with the places; and a sending unit for sending the OD sub-matrix to another computer.

2. The computer according to claim 1, further comprising a time adjustment unit for adjusting times of arrival and/or departure from the stations by a linear extrapolation based on, at least in part, data time stamped between the stations.

3. The computer according to claim 1, wherein the station identification unit is configured to: (i) determine a geographical position associated with each time stamp for a user ID as either a first condition indicating that a user equipment associated with the user ID is moving or a second condition indicating that the user equipment is stationary and (ii) create a station if: (a) the geographical position is determined to be in the second condition with respect to a first time stamp and is determined to be in the first condition with respect to a second time stamp immediately following the first time stamp and (b) the second condition preceding a change to the first condition has been maintained for a longer time than a time threshold.

4. The computer according to claim 3, wherein the station identification unit is configured to calculate a mean value for the geographical position of the station based on, at least in part, consecutive geographical positions related to the second condition.

5. The computer according to claim 4, wherein the station identification unit is configured to calculate the mean value also based on, at least in part, the time between the time stamps associated with the second condition in such a way that a longer time between two consecutive geographical positions gives a higher influence on the mean value than if the time would have been shorter.

6. A computer for supporting generation of an OD matrix based on, at least in part, network data associated with a plurality of user IDs, comprising:

a receiving unit for receiving a user ID, cell IDs and time stamps associated with the cell IDs and the user ID;

a requesting unit for requesting, from a cell ID database, geographical coordinates corresponding to a cell ID;

a station identification unit for determining stations based on, at least in part, the geographical coordinates and time stamps;

a clustering unit for clustering the determined stations into at least two clusters;

a calculation unit configured to calculate, for each one of the clusters, a position of a new station based on, at least in part, the stations belonging to the same cluster;

a mapping unit for exchanging the new stations with a place for each one of the new stations;

an OD matrix generating unit for generating at least one OD sub-matrix associated with the user ID based on, at least in part, places and times of arrival and departure associated with the places; and a sending unit for sending the OD sub-matrix to another computer.

7. The computer according to claim 6, further comprising a time adjustment unit for adjusting times of arrival and/or departure from the stations by a linear extrapolation based on, at least in part, data time stamped between the stations.

8. A computer for supporting generation of an OD matrix based on, at least in part, network data associated with a plurality of user IDs, comprising:

a receiving unit for receiving a user ID, associated geographical coordinates and time stamps associated with the geographical coordinates and the user ID;

a station identification unit for finding stations based on, at least in part, the geographical coordinates and time stamps;

a mapping unit for exchanging the stations with a place for each one of the stations;

an OD matrix generating unit for generating at least one OD sub-matrix associated with the user ID based on, at least in part, places and times of arrival and departure associated with the places; and a sending unit for sending the OD sub-matrix to another computer.

9. The computer according to claim 8, further comprising a time adjustment unit for adjusting times of arrival and/or departure from the stations by a linear extrapolation based on, at least in part, data time stamped between the stations.

10. A computer for supporting generation of an OD matrix based on, at least in part, network data associated with a plurality of user IDs, comprising:

a receiving unit for receiving a user ID, associated geographical coordinates and time stamps associated with the geographical coordinates and the user ID;

a station identification unit for finding stations and times based on, at least in part, the geographical coordinates and time stamps;

a clustering unit for clustering the stations into at least two clusters;

a calculation unit for calculating, for each one of the clusters, a position of a new station based on, at least in part, the stations belonging to the same cluster;

a mapping unit for exchanging the new stations with a place for each one of the new stations;

an OD matrix generating unit for generating at least one OD sub-matrix associated with the user ID based on, at least in part, places and times of arrival and departure associated with the places; and a sending unit for sending the OD sub-matrix to another computer.

11. The computer according to claim 10, further comprising a time adjustment unit for adjusting times of arrival and/or departure from the stations by a linear extrapolation based on, at least in part, data time stamped between the stations.

12. A computer system comprising at least one computer according to claim 1.

13. The computer system according to claim 12, utilizing Hadoop map/reduce for generating the OD matrix and comprising a master computer connected to the at least one computer, which is a slave computer.

14. A method performed by a computer system for generating an OD matrix based on, at least in part, network data associated with a plurality of user IDs, comprising the steps of:

receiving user IDs, cell IDs and time stamps associated with the cell IDs and the user IDs;

requesting and receiving, from a cell ID database, geographical coordinates corresponding to the cell IDs;

finding stations and times for each user ID based on, at least in part, the geographical coordinates and time stamps associated with each user ID;

exchanging the stations with a place for each one of the stations;

generating at least one OD sub-matrix for each user ID based on, at least in part, places and times of arrival and departure associated with the places; and merging the OD sub-matrices into the OD matrix.

15. The method according to claim 14, further comprising the step of storing the OD matrix in a non-volatile memory.

16. The method according to claim 14, further comprising the step of adjusting times of arrival and/or departure from the stations by a linear extrapolation based on, at least in part, data time stamped between the stations.

17. The method according to claim 14, further comprising the steps of:

clustering the stations into at least two clusters, and calculating, for each one of the clusters, a position of a new station based on, at least in part, the stations belonging to the same cluster, and instead of exchanging the stations exchanges the new stations with the respective place.

18. A user equipment for supporting generation of an OD matrix based at least partly on network data associated with a plurality of user IDs, comprising:

a unit for receiving or retrieving geographical coordinates and associated time stamps;

a station identification unit for finding stations and times;

a mapping unit for exchanging the stations with a place for each one of the stations;

an OD matrix generating unit for generating at least one OD sub-matrix based on, at least in part, places and times of arrival and departure associated with these places, and a sending unit for sending the OD sub-matrix to a computer system.

19. The user equipment according to claim 18, wherein the unit for receiving or retrieving geographical coordinates and associated time stamps also is configured to receive or retrieve a user ID associated with the user equipment or a user of the user equipment, and wherein the sending unit is adapted to send the user ID along with the OD sub-matrix.

20. The user equipment according to claim 18, further comprising a time adjustment unit for adjusting times of arrival and/or departure from the stations by a linear extrapolation based on, at least in part, data time stamped between the stations.

21. The user equipment according to claim 18, comprising a clustering unit for clustering the stations into at least two clusters, and a calculation unit for calculating, for each one of the clusters, a position of a new station based on, at least in part, the stations belonging to the same cluster, and wherein the mapping unit instead of exchanging the stations exchanges the new stations with the respective place.

22. A computer program product for generating an OD matrix based on, at least in part, network data associated with a plurality of user IDs, the computer program product comprising a non-transitory computer-readable medium storing a computer program for execution by a processor, the computer program comprising:

code units for requesting, from a cell ID database, geographical coordinates corresponding to the cell IDs;

code units for determining, for each of a plurality of user IDs, stations based on, at least in part, geographical coordinates and time stamps associated with each user ID;

code units for exchanging the stations with a place for each one of the stations;

code units for generating at least one OD sub-matrix associated with each user ID based on, at least in part, places and times of arrival and departure associated with the places; and code units for merging the OD sub-matrices into the OD matrix.

23. A computer program product for supporting generation of an OD matrix based on, at least in part, network data associated with a plurality of user IDs, the computer program product comprising a non-transitory computer-readable medium storing a computer program for execution by a processor, the computer program comprising:

code units for receiving or retrieving geographical coordinates and associated time stamps;

code units for finding stations;

code units for exchanging the stations with a place for each one of the stations, code units for generating at least one OD sub-matrix based on, at least in part, places and times of arrival and departure associated with the places, and code units for sending the OD sub-matrix to a computer system.

24. The computer according to claim 1, wherein the requesting unit is configured to request the geographical coordinates from the cell ID database by transmitting to the cell ID database a cell ID lookup request message that comprises said cell ID.

25. The computer according to claim 24, wherein the cell ID database is configured such that, in response to receiving the cell ID lookup request message comprising said cell ID, the cell ID database transforms said cell ID included in said message to a tuple comprising a latitude value and longitude value.

26. The computer according to claim 1, wherein, for each one of the stations, said place associated with said station comprises a word or phrase by which said station is known or referred to.

27. The computer of claim 6, wherein the calculation unit is configured to calculate said position of said new station based on the stations belonging to said same cluster by determining the mean position of the positions of all stations included in the said cluster.

* * * * *